(12) United States Patent
Gerber

(10) Patent No.: US 7,621,669 B1
(45) Date of Patent: *Nov. 24, 2009

(54) BLENDER FOR INGREDIENTS AND FLAVORING FOR SOFT-SERVE FREEZER PRODUCT

(75) Inventor: Ernest C. Gerber, Danville, IN (US)

(73) Assignee: Flavor Burst Co., L.L.P., Danville, IN (US)

( * ) Notice: Subject to any disclaimer, the term of this patent is extended or adjusted under 35 U.S.C. 154(b) by 868 days.

This patent is subject to a terminal disclaimer.

(21) Appl. No.: 11/181,604

(22) Filed: Jul. 14, 2005

Related U.S. Application Data

(63) Continuation-in-part of application No. 10/796,742, filed on Mar. 9, 2004, now Pat. No. 7,178,976.

(51) Int. Cl.
*B01F 15/02* (2006.01)
(52) U.S. Cl. ............. 366/177.1; 366/181.1; 366/181.3; 366/181.4; 366/196
(58) Field of Classification Search .............. 366/177.1, 366/169.1, 170.4, 156.1, 156.2, 157.1–157.4, 366/178.1–178.3, 181.1–181.4, 158.1–158.4
See application file for complete search history.

(56) References Cited

U.S. PATENT DOCUMENTS

| | | | |
|---|---|---|---|
| 1,449,623 A | 3/1923 | Pfouts |
| 2,032,970 A | 3/1936 | Bendfelt |
| 2,190,226 A | 2/1940 | Alexander |
| 2,239,165 A | 4/1941 | Adams |
| 2,576,842 A | 11/1951 | Lehner |
| 2,592,709 A | 4/1952 | Kinnaird |
| 2,995,107 A | 8/1961 | Archer |
| 3,001,770 A | 9/1961 | Mueller |
| 3,014,437 A | 12/1961 | Dutchess |

(Continued)

FOREIGN PATENT DOCUMENTS

DE  3521612 A1  11/1986

(Continued)

OTHER PUBLICATIONS

Supplementary European Search Report, Application No. EP 05 72 4774, PCT/US2005007295, Applicant: Flavor Burst Co., Search Report mailed Oct. 27, 2008, 3 Pages.

*Primary Examiner*—Tony G Soohoo
(74) *Attorney, Agent, or Firm*—Woodard, Emhardt, Moriarty, McNett & Henry LLP

(57) ABSTRACT

An assembly is mounted to a soft serve confection freezer. It includes a set of modules in a circular array and separately replaceable in a magazine. Each module supports a container storing a dry food ingredient in particulate form, and has a motor driven product impeller for controlled discharge of particulates from the container to a blender assembly. The blender assembly has a housing and screw-type auger of cooperating configurations and which cooperate with a central passageway for frozen confection flowing from the freezer, to blend solids into the confection and discharge into a customer's container for immediate consumption. Control panel selection of ingredients by the operator according to the customer's order, is provided. Components are arranged to facilitate cleaning. A system for control panel selection by the operator of liquid additives to the flowing confection, is provided to accommodate the customer's order.

18 Claims, 17 Drawing Sheets

U.S. PATENT DOCUMENTS

| | | | |
|---|---|---|---|
| 3,132,847 | A | 5/1964 | Mercuiali |
| 3,167,031 | A | 1/1965 | Taylor |
| 3,291,076 | A | 12/1966 | Flanigan et al. |
| 3,347,287 | A | 10/1967 | Geber |
| 3,477,393 | A | 11/1969 | Bell et al. |
| 3,803,870 | A | 4/1974 | Conz |
| 3,918,862 | A | 11/1975 | Bellew |
| 3,920,223 | A * | 11/1975 | Krueger .................. 366/156.2 |
| 4,010,284 | A | 3/1977 | Bellew |
| 4,100,304 | A | 7/1978 | Getman |
| 4,188,768 | A | 2/1980 | Getman |
| 4,189,289 | A | 2/1980 | Getman |
| 4,397,880 | A | 8/1983 | Crothers |
| 4,397,881 | A | 8/1983 | Crothers |
| 4,447,458 | A | 5/1984 | Roth et al. |
| 4,448,114 | A | 5/1984 | Mayer |
| 4,574,593 | A | 3/1986 | Nelson |
| 4,643,335 | A | 2/1987 | Carnisio |
| 4,643,905 | A | 2/1987 | Getman |
| 4,668,561 | A | 5/1987 | Ney |
| 4,793,520 | A | 12/1988 | Gerber |
| 4,861,255 | A | 8/1989 | Ney |
| 4,881,663 | A | 11/1989 | Seymour |
| 4,923,093 | A | 5/1990 | Gerber |
| 5,256,426 | A | 10/1993 | Tomioka et al. |
| 5,271,572 | A | 12/1993 | Grandi |
| 5,378,483 | A | 1/1995 | Fazio et al. |
| 5,690,283 | A | 11/1997 | Sandolo |
| 5,743,639 | A | 4/1998 | Puerner et al. |
| 5,823,392 | A | 10/1998 | Madico |
| 6,145,701 | A | 11/2000 | Van Der Merwe et al. |
| 6,319,532 | B1 | 11/2001 | Pineault |
| 6,514,555 | B1 | 2/2003 | Fayard et al. |
| 6,689,410 | B2 | 2/2004 | Gerber |
| 2003/0000240 | A1 | 1/2003 | Pahl |
| 2003/0085237 | A1 | 5/2003 | Kateman et al. |
| 2003/0145734 | A1 | 8/2003 | Ervin |
| 2005/0175767 | A1 | 8/2005 | Gerber |
| 2005/0201196 | A1 | 9/2005 | Gerber |
| 2005/0263536 | A1 | 12/2005 | Selfridge et al. |
| 2006/0013941 | A1 | 1/2006 | Miller |
| 2007/0110872 | A1 * | 5/2007 | Gerber ....................... 426/565 |

FOREIGN PATENT DOCUMENTS

| | | |
|---|---|---|
| GB | 1465312 | 2/1977 |

* cited by examiner

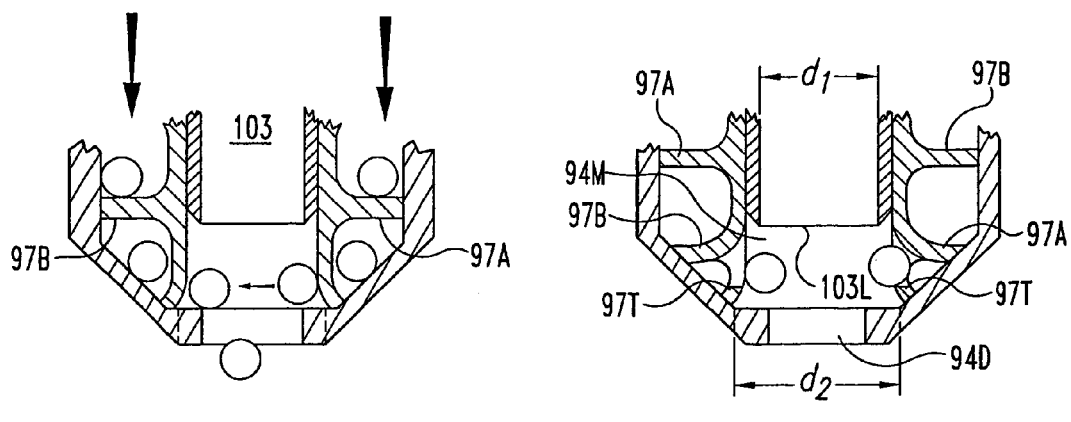
Fig. 13
Fig. 14
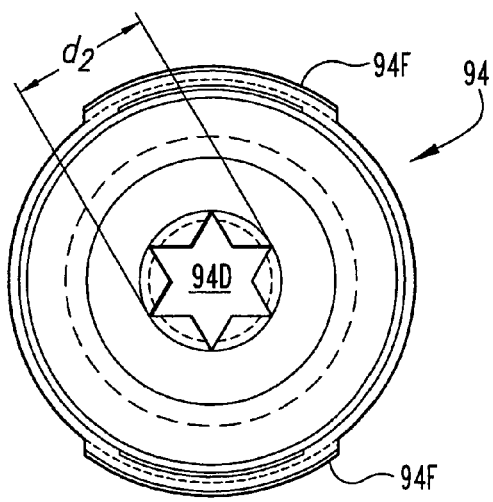
Fig. 15

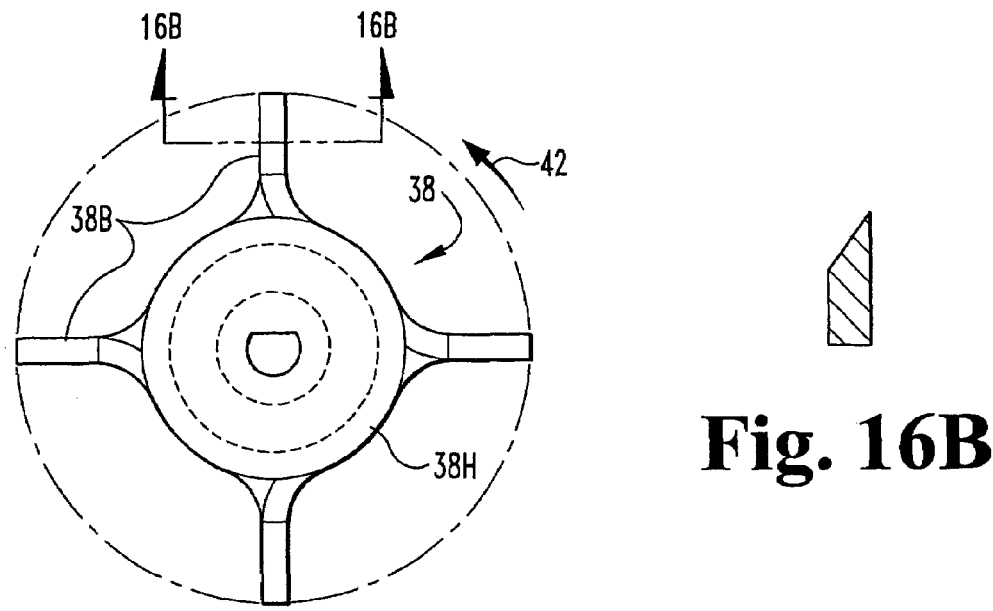
Fig. 16B
Fig. 16A
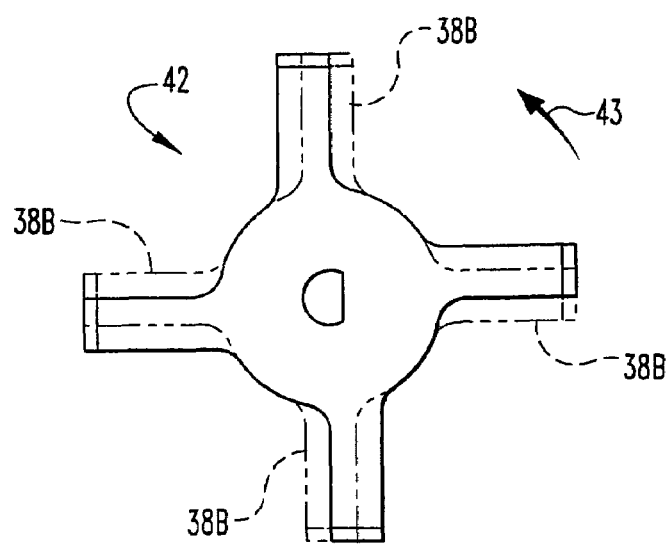
Fig. 17

US 7,621,669 B1

BLENDER FOR INGREDIENTS AND FLAVORING FOR SOFT-SERVE FREEZER PRODUCT

This application is a continuation-in-part of patent application Ser. No. 10/796,742 filed Mar. 9, 2004, now U.S. Pat. No. 7,178,976, issued on Feb. 20, 2007, and upon which priority is claimed.

BACKGROUND OF THE INVENTION

This invention relates generally to apparatus for dispensing flavored, flow-able frozen foods to a customer for soft-serve ice cream, ice milk, ices, smoothies, slushes, shakes or the like.

My U.S. Pat. No. 4,793,520 issued Dec. 27, 1988 and certain patents cited therein, disclose various approaches to mixing several different flavoring liquids to a base mix of ice cream. U.S. Pat. No. 3,001,770 issued to Mueller on Sep. 26, 1961 shows a machine for mixing different flavoring liquids with ice cream and has a device for injecting nuts into the mixture. To the best of my knowledge, there is no apparatus available which can be connected to a conventional freezer machine for soft-serve ice cream or some other semi-frozen edible product, and which is useful to select and blend one or more different ingredients into the food product of the freezer machine for dispensing into a cone or cup to a customer immediately upon demand. The present invention is addressed to this need.

SUMMARY OF THE INVENTION

Described briefly, one embodiment of the invention comprises method and apparatus readily adaptable to use with conventional, commercially available freezer dispensers for semi-frozen foods, and enabling selection and blending various different food ingredients in solid form into a food product dispensed as a fluid (hereinafter referred to as frozen base product) from the freezer dispenser at a temperature below 0 degrees Celsius, and dispensing selected blends of solids in frozen base product in fluid form to a customer's container on demand.

Another embodiment enables the additional feature of selection and blending various flavorings and colorings, into the frozen base product.

BRIEF DESCRIPTION OF THE DRAWINGS

FIG. 13 is a fragmentary longitudinal sectional view of part of the blending auger and blender hopper taken at line 13-13 in FIG. 10 and showing the shape of the lower end portion of the auger core at a position about 60 degrees of rotational index about axis 93 from the FIG. 11 position.

FIG. 14 is a view similar to FIG. 13 but taken at line 14-14 in FIG. 10 and showing the shape of the auger core and flights at a slightly further rotational index position where portions of the core are cut-out to admit ingredient solids into a downward flowing frozen confection base product.

FIG. 15 is a top view of the blender hopper, showing one possible outlet shape, and showing mounting flanges.

FIG. 16A is a top plan view of a transfer impeller.

FIG. 16B is a section taken at line B-B in FIG. 16A and viewed in the direction of the arrows.

FIG. 17 is a top plan view of an agitator.

DESCRIPTION OF THE ILLUSTRATED EMBODIMENTS

Figure 1:
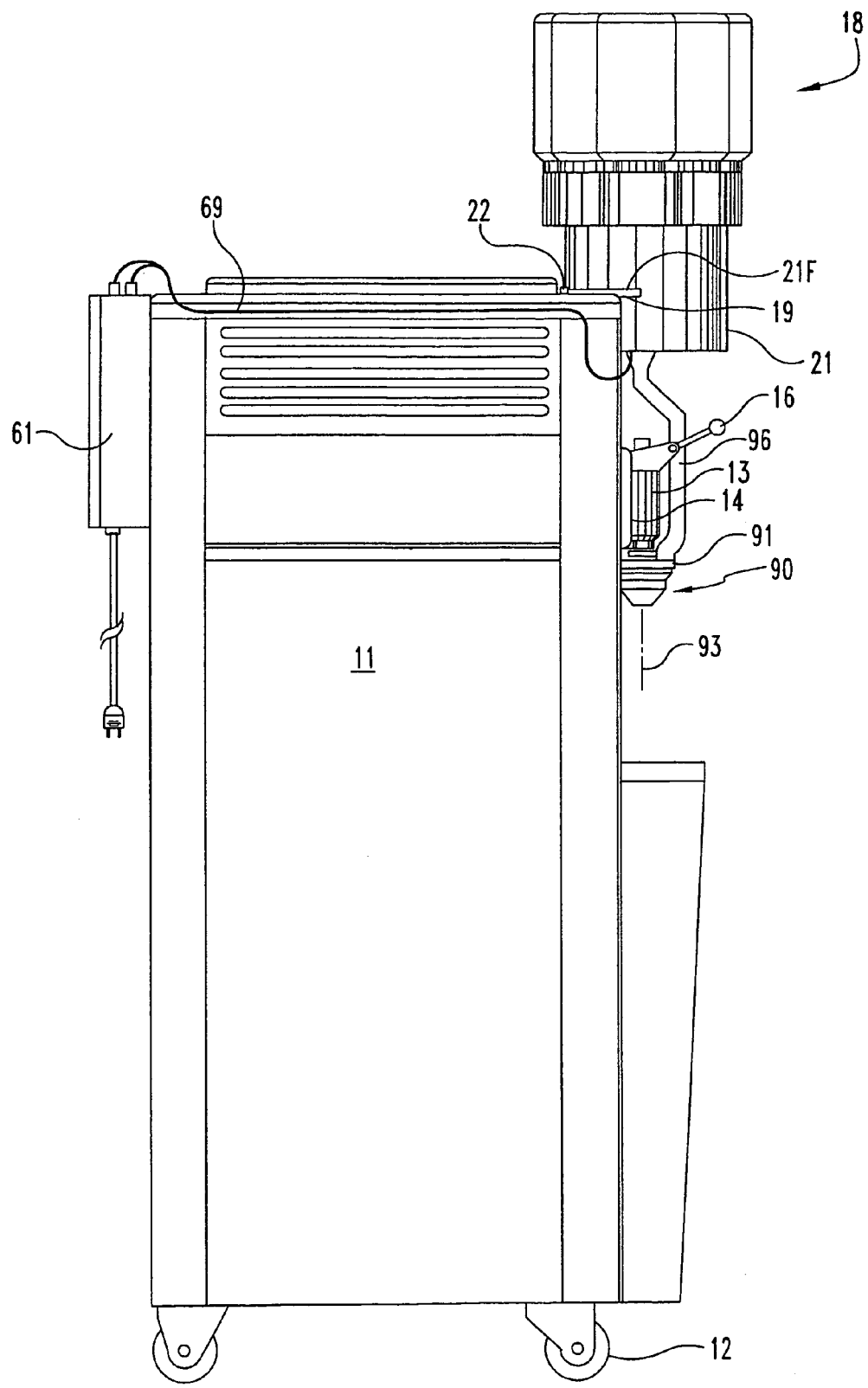
FIG. 1 is a side elevational view of a conventional soft-serve ice cream freezer machine with a blender dispenser mounted to it according to one embodiment of the present invention.

Referring now to FIGS. 1-19 of the drawings in detail, a soft-serve ice cream freezer assembly 11 is supported on wheels 12 and has a discharge spigot 13 on a front plate 14 removable from the freezer, usually by loosening four knobs. The spigot has an operating handle 16. Upon pulling the handle down, a frozen, usually unflavored, base product is discharged from the freezer through the spigot in the direction of arrow 17. Examples of such soft serve freezers are Taylor Model 754, 338, 339, 741, H84, 8754, C706, C707, and C708. Other brands of freezers may be used also. Some older Taylor models and other brands are identified in my above-mentioned patent.

Apparatus incorporating an embodiment of the present invention includes an ingredient storage assembly, a blender assembly, means for transfer of selected ingredients from the storage assembly to the blender assembly, and related mounting, selection and control devices.

The ingredient storage and transfer assembly 18 is attached to the top of the freezer by use of a mounting plate 19 (FIG. 1). This plate uses a double-faced bonding tape that bonds the plate to the top of the freezer cabinet. Other or additional fasteners may be used, if desired. Mounting base 21 is a molded plastic part FIG. 5 having a flange 21F with slots 21S in its rear-edge receiving upstanding studs (not shown) on the mounting plate 19. It is attached to the mounting plate by use of two clamping knobs 22 screwed onto the studs and securing the mounting base to the mounting plate.

The upper end of the mounting base 21 supports and centers the top flange of funnel 23. An upper support plate 24 (FIGS. 2A and 6) rests on the top flange of the funnel. This plate supports eight removable modules 25 in a circular array about an axis 26 through the center of the plate 24. A lower support plate 27 (FIGS. 2A and 7) rests on the ledge 21L of the mounting base. It is connected to upper support plate 24 by an array of eight circularly spaced vertical support plates 28, preferably made of molded plastic and having bosses 28B at upper and lower edges receiving screws through the holes 24H and 27H in the upper and lower support plates 24 and 27, respectively. This assembly of plates 24, 27 and 28 provides a receiver frame in the ingredient storage assembly 18 for the eight removable dispensing modules 25 mentioned above. These modules have motor housings 29 supporting container bases 31 receiving eight ingredient containers 32. Each of these containers contains a different type of solids capable of being blended into the base product flowing from the freezer to the spigot outlet when the handle 16 is pulled down. A "solid" for such purposes may be defined as a discrete tangible edible item appearing dry to touch at 72° F., elastic or inelastic, porous or non-porous, hollow or not hollow, and having a maximum overall dimension in any direction less than or equal to about 0.300 inches. Some types of solids include, but are not limited to, nuts of different types and flavors, raisins, M & M's, chocolate chips, different flavors of fruit bits, different flavors of candy bits and sprinkles, to name a few. Others may be used too. Also, if it is found that customers have a greater preference for one type than some of the other types, more than one of the containers can be filled with the preferred type.

Figure 2A:
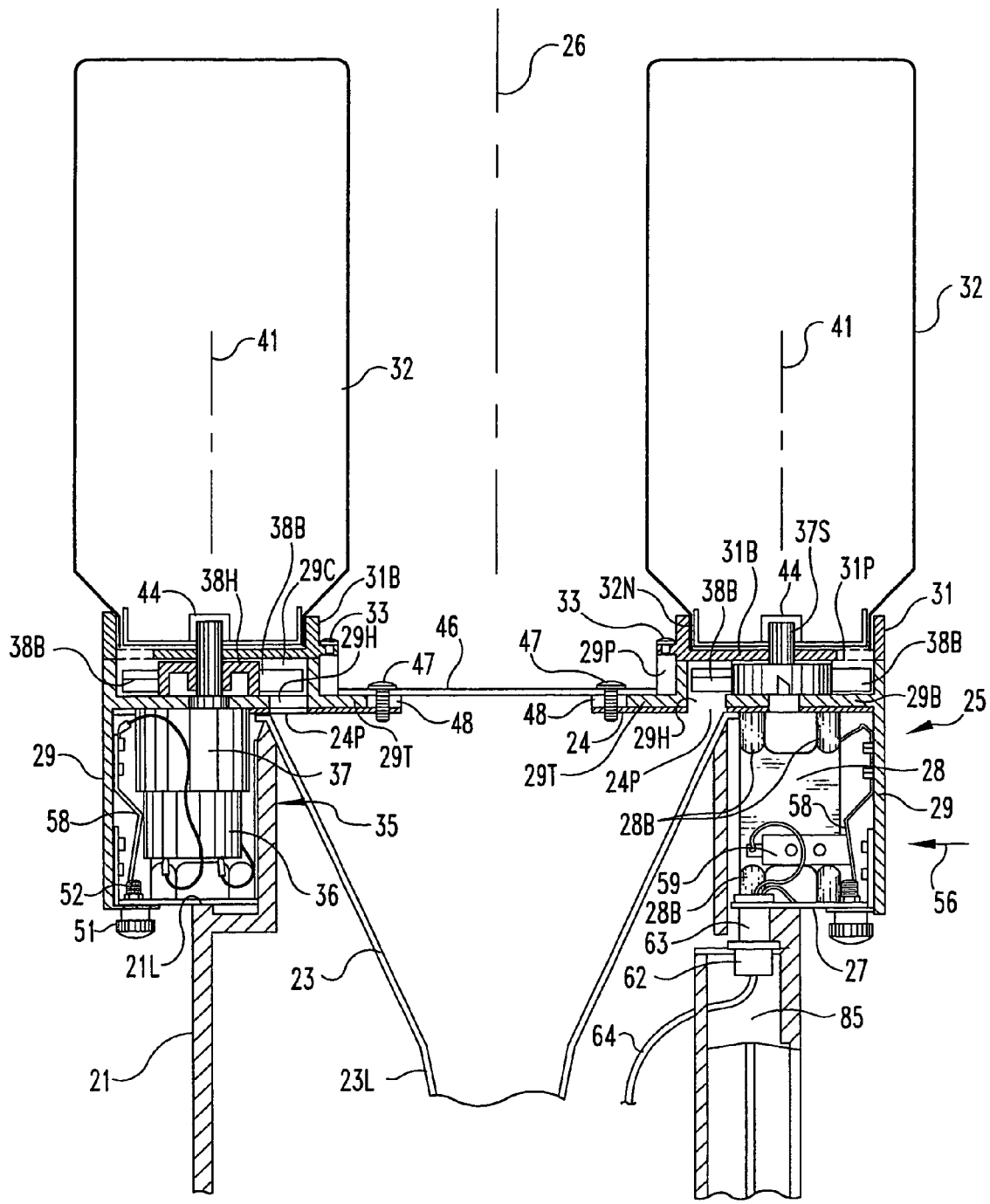
FIG. 2A is an enlarged front view in section of an ingredient storage and transfer assembly.
Figure 8:
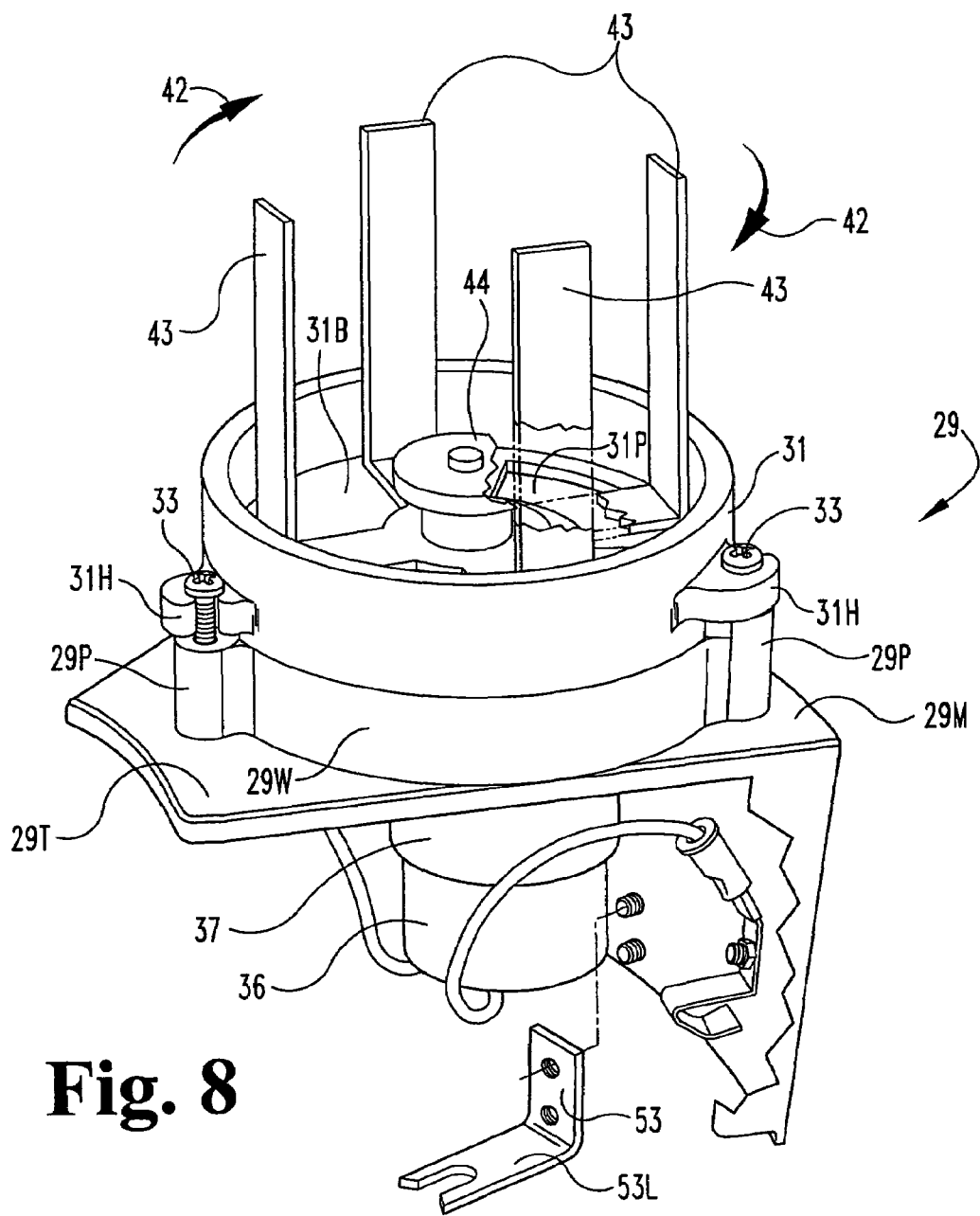
FIG. 8 is a perspective view of a dispensing module.
Figure 9:
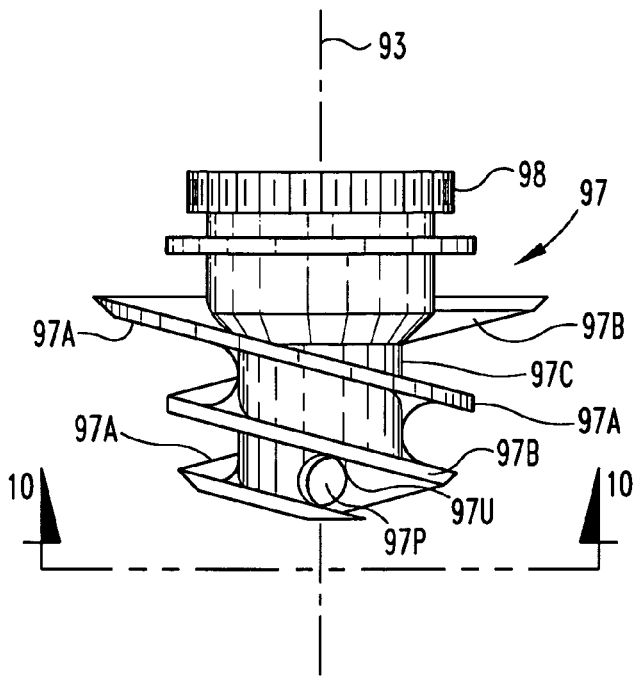
FIG. 9 is an enlarged elevational view of a blending auger.

All of the eight modules can be identical, so a description of one will suffice. Referring to FIG. 2A, note that the module shown to the left of the axis 26 shows motor housing 29 with a gear motor assembly 34 inside, but a gear motor assembly for the module to the right side of axis 26 is omitted from the drawing to show other details of the module. Referring specifically to FIGS. 2A and 8, each motor housing 29, usefully made of molded plastic, has a mounting portion 29 M which is shaped like a sector of a circle, and is received on upper support plate 24. The housing has a cylindrical wall 29W projecting up from portion 29M and forming an upwardly opening cylindrical chamber 29C (FIG. 2A). The bottom 29B of chamber 29C is the top of an area of mounting portion 29M and has a hole 29H which is in registry with one of the eight holes 24P in the support plate 24.

Container base 31 (also usefully made of molded plastic) sits atop the motor housing 29 and has three hooks received on posts 29P of housing 29 and engaging and hooked to screws 33 in posts 29P by a counterclockwise twist of the base 31 relative to the housing 29. The bottom 31B of the container base 31 has a hole 31P (FIG. 8) which is in a sector diametrically opposite (relative to axis 41) the sector in which hole 24P in the upper support plate 24, and hole 29H in the housing 29 are located, the latter holes 24P and 29H being open to the funnel 23.

The gear motor assembly 34 with motor portion 36 and reduction gear portion 37 is fastened by screws (not shown) to the bottom of the mounting portion 29M of the motor housing. The output drive shaft 37S of the gear portion projects up through a small hole in the center of chamber bottom 29B, and through the hub 38H of ingredient transfer impeller 38 (FIGS. 15A, 15B) which has four blades 38B circularly spaced about the shaft axis 41. The blades are about half the height of the chamber 29C. The upper portion of the leading (when the impeller is driven in the direction of arrow 42) edge of each blade is sloped up toward the trailing edge. This feature helps avoid jamming of certain types of ingredients between the impeller blades and the roof of the chamber 29C. The shaft 37S also projects through a small hole in the center of bottom 31B of the container base 31 and through the hub of the four-arm agitator 43 (FIG. 16). The shaft receiving holes in the center of the transfer impeller hub and in the center of the agitator hub have a flat which matches the flat on drive shaft 37S to drive the impeller and agitator when the motor is energized. A rubber cap 44 holds the agitator on the shaft.

As shown in FIG. 16A, the agitator arms are slightly offset ahead of radii from the rotational axis 41 of the agitator. Accordingly the leading edges of the agitator arms are about one-half arm's width ahead of the leading edge of the transfer impeller blades. This is shown in FIG. 17 where the impeller arms are shown in dotted lines. This feature assists in the transfer of ingredients from a container 32 to chamber 29C.

The container base 31 provides an upwardly opening cylindrical chamber which friction fits and receives the neck portion 32N at the open end of container 32. The fit is close enough that there is no leakage of the dry ingredients up and out of the base 31 around the container neck.

Each module is retained in place in at least two ways. The first way involves a motor housing retainer plate 46 fastened to upper support plate 24 by four screws 47 equally spaced circularly, about axis 26, with spacers 48 between plates 24 and 46. The spacing thereby provided admits the tongue 29T (FIG. 8) of the motor housing and prevents it from tipping up.

A second way the module is retained is by a clamping knob 51 fixed to a screw 52 which is freely receivable into a slot in leg 53L of bracket 53 which is fixed to the inside wall of motor housing 29. The slot is forked with its open end facing toward axis 26. The screw is threaded into lower support plate 27 so that, when a module is properly inserted as in the direction of arrow 56 (FIG. 2A) toward axis 26, the screw is received in the fork slot and the knob 51 can be turned to clamp the module to the lower support plate 27. So it is clamped to the receiver frame of plates 24, 27, 28.

Each of the modules has two electrical contactors 58 on the inner face of the motor housing and which, when the module is installed, engage contactors such as 59 mounted on the vertical supports 28, to enable electric power feed from an electronic controller 61 (FIG. 1) to the motors 36. An eight pair connector socket 62 fixed in the mounting base receives mating plug 63 fixed in the lower support plate 27. The two contactors 59 from all of the eight stations are wired to plug 63. A pair of leads from the socket at 62 extend in wire 64 to the plug 66 received in socket 67 at the end of wiring 68 which enters the wiring harness 69, which extends to the controller 61. The wiring harness also contains cables 71, 72 and 73, each of which has an electrical socket at the end for connection to some component of the apparatus. Cable 71 connects to a plug 74 for communication with the data entry panel 76. Cable 72 connects to a plug 77 for cable 78 to an auger drive motor 79. The plug on cable 73 is connected to socket 81 for the dispenser start switch 82. This arrangement makes it easy to disconnect the electrical components by simply removing the mounting base cover panel 83 from the bottom of the mounting base and unplugging the electrical connectors.

The data entry panel (DEP) 76 is received in a downwardly opening slot 84 (FIGS. 2A, 2B and 5) by sliding it upward into the slot 84 and into chamber 85 in the mounting base. It is retained in place by the mounting base cover panel 83 which is screwed into the bottom of the mounting base. The face of the keypad has legends for programming the equipment, as will be described hereinafter. The output from the keypad is fed through connector 74 and cable 71 in harness 69 to the controller 61.

A blender assembly 90 has a housing 91 (FIG. 2B and FIG. 18 bottom view) mounted to and supported on the freezer by a mounting bracket (not shown) to secure the blender assembly to the freezer. The blender assembly is coupled to spigot 13 by adapter 92 having upper end 92U received on and sealed by an o-ring to the spout. The adapter has flange 92F receiving a collar 92C connected to the upper end portion 90U of the blender assembly by a split ring retainer 92R in a circular groove in the upper end portion of the blender assembly. The adapter is sealed by an o-ring to the inside surface of the upper end portion 90 U of the blender assembly. Varieties of mounting brackets and adapters are available to accommodate different freezer configurations. Since a freezer typically dispenses in some axial direction, it can be convenient but is not necessary to adopt such axis in implementing the present invention. In the present example, an axis 93 is established by the housing 91 for the blender assembly. A blender hopper 94 is mounted to housing 91.

Figure 18:
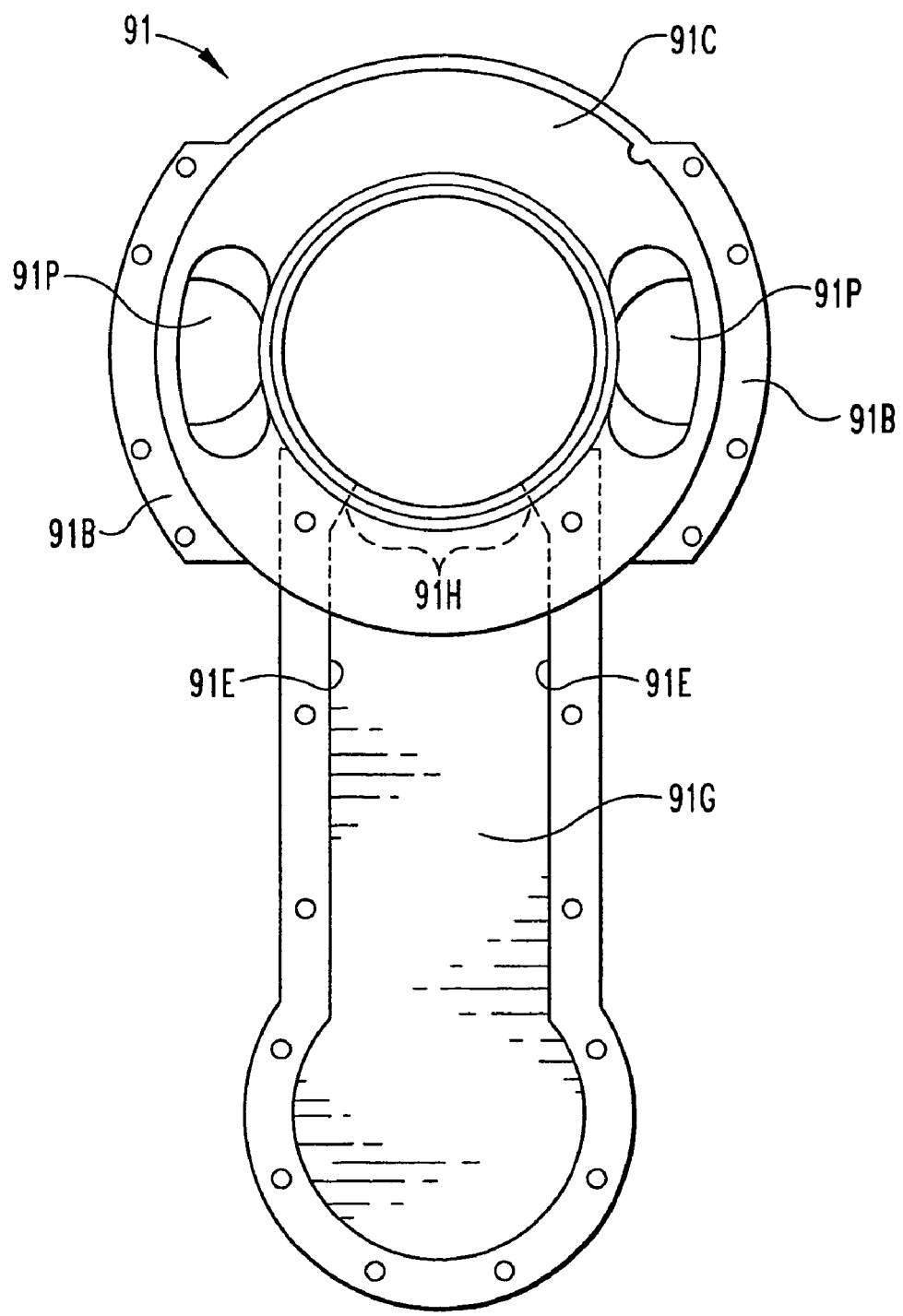
FIG. 18 is a bottom view of a blender housing, with bottom coverings removed.
Figure 19:
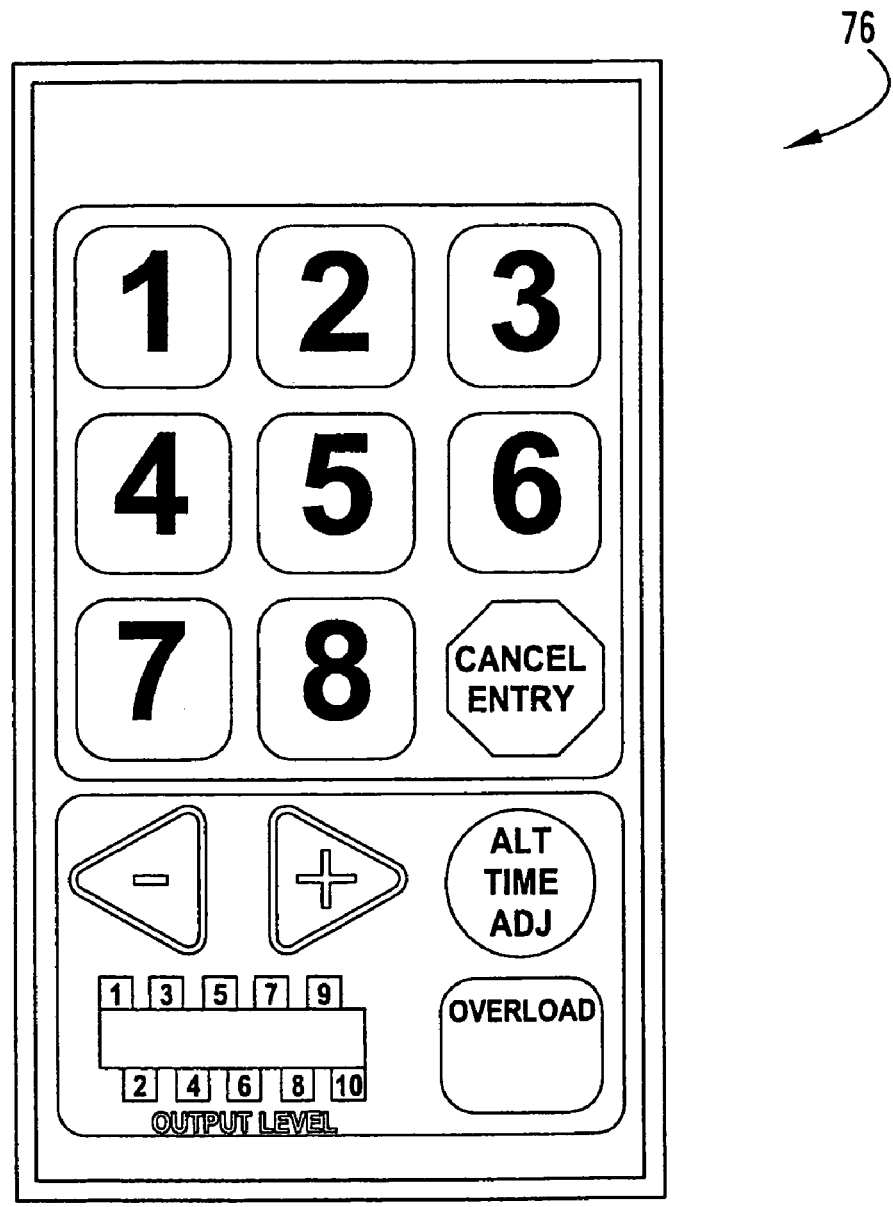
FIG. 19 is a front view of a data entry panel.
Figure 20:
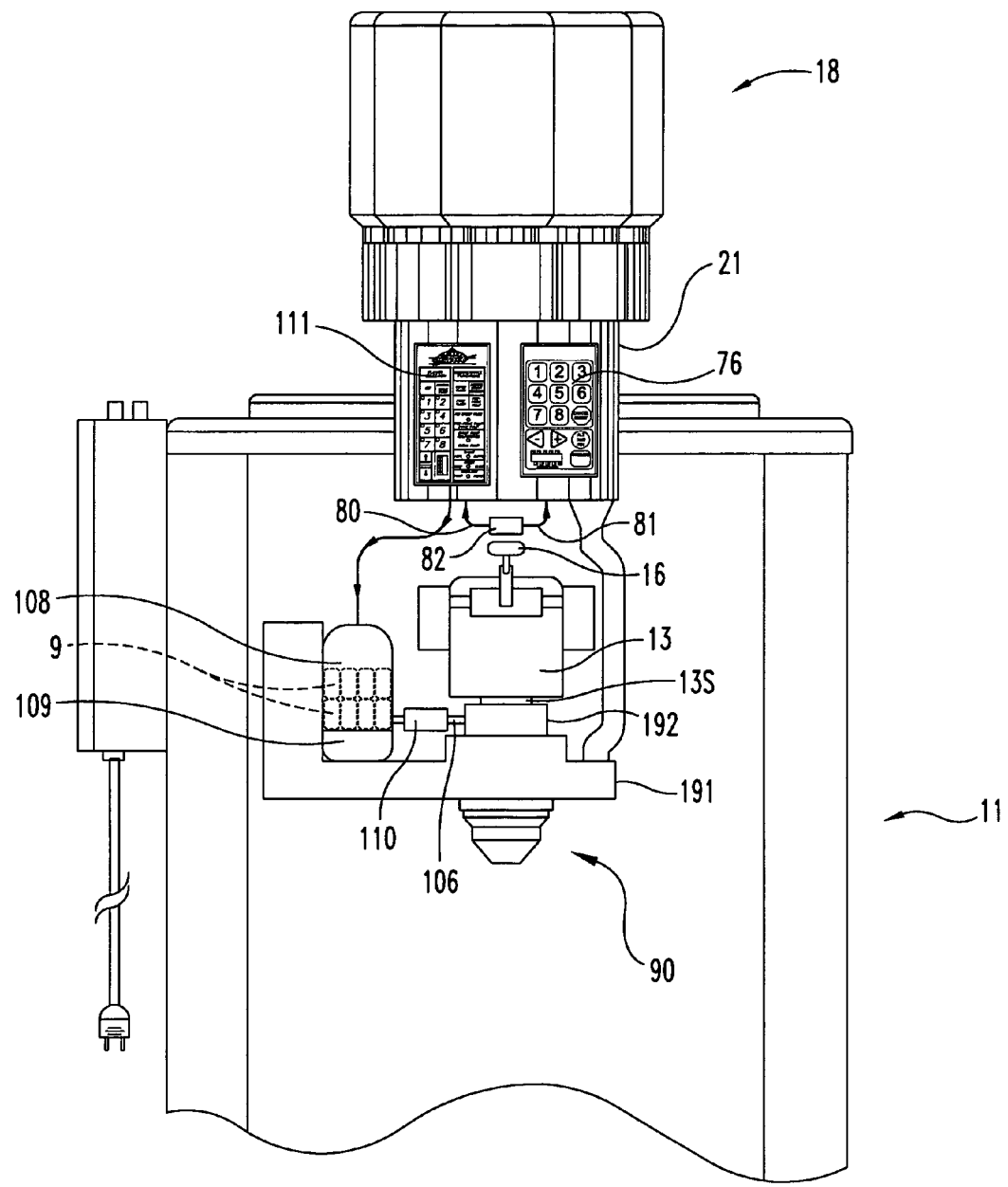
FIG. 20 is an elevational view in schematic form of a further embodiment of the present invention.

Since the blender hopper is to receive solid ingredients from selected ones of containers 32, the housing 91 has two upwardly-opening circular ports 91P to which tubing 96 can be connected to deliver ingredients from hopper 23 through the housing 91 to the blender hopper 94. In FIG. 18, these ports are shown, but need not be, located on diametrically opposite sides of the cylindrical wall 91W of the housing and which is centered on axis 93. It is adequate to use only one of these ports for connection to the tubing, but two of them are provided to facilitate alternate entry locations for adaptation to freezers of different designs.

Figure 2B:
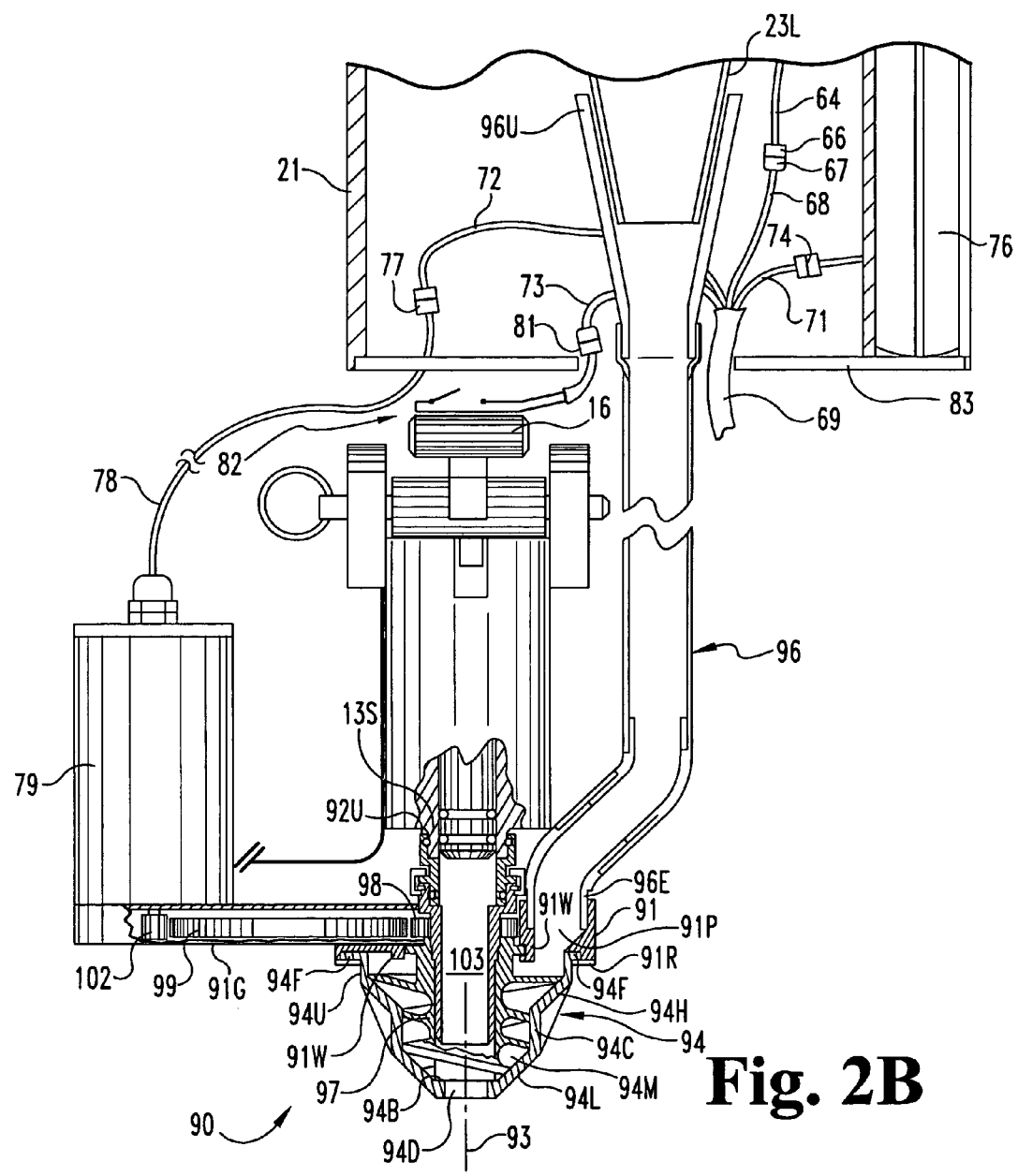
FIG. 2B is a front view in section on the same scale as FIG. 2A and showing a blender assembly.
Figure 3:
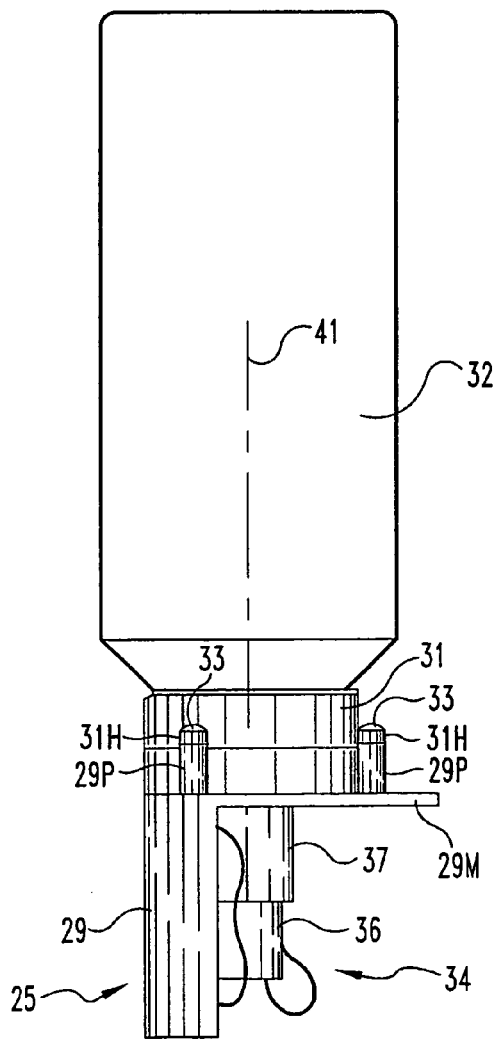
FIG. 3 is a side view of an ingredient container module.
Figure 4:
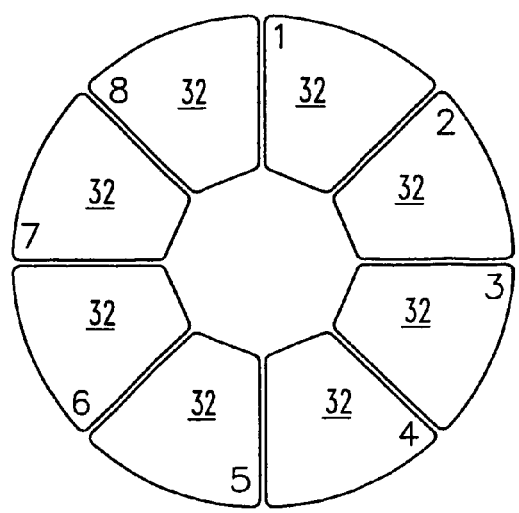
FIG. 4 is a top plan view of an array of eight ingredient containers on a scale intermediate FIGS. 1 and 3.
Figure 5:
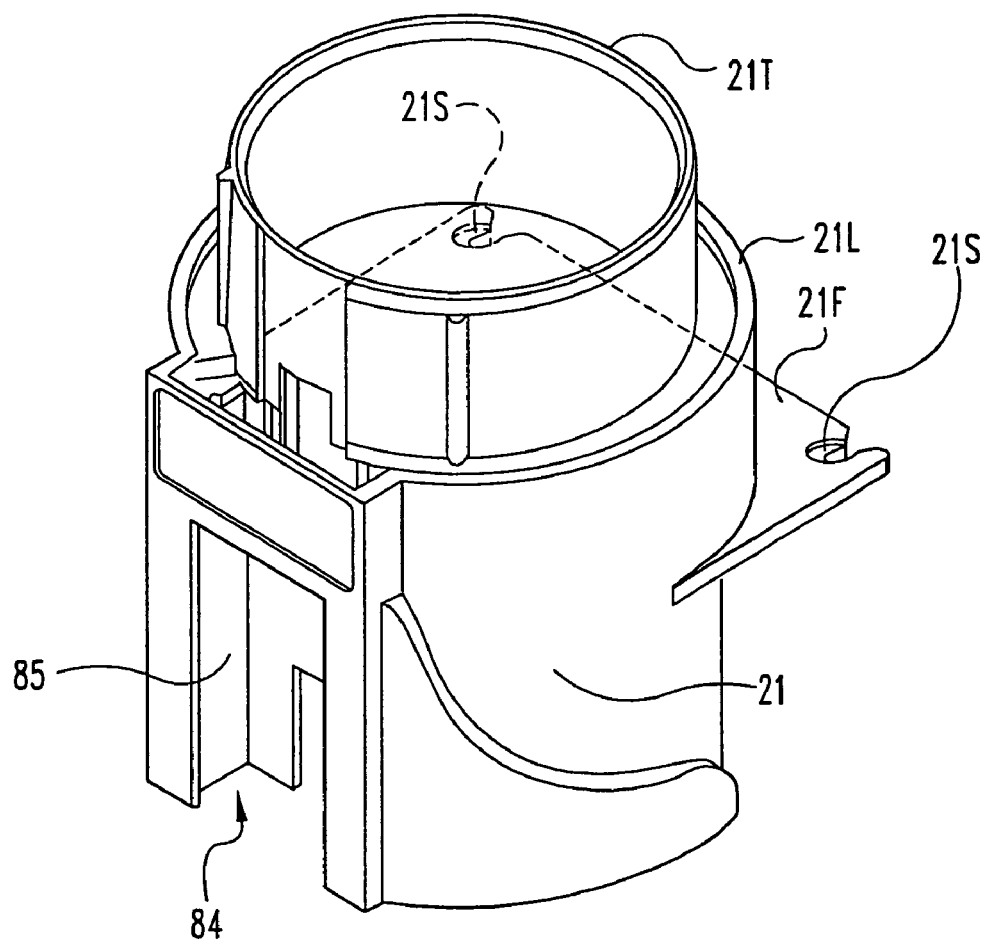
FIG. 5 is a perspective view of a mounting base for the ingredient storage assembly.
Figure 6:
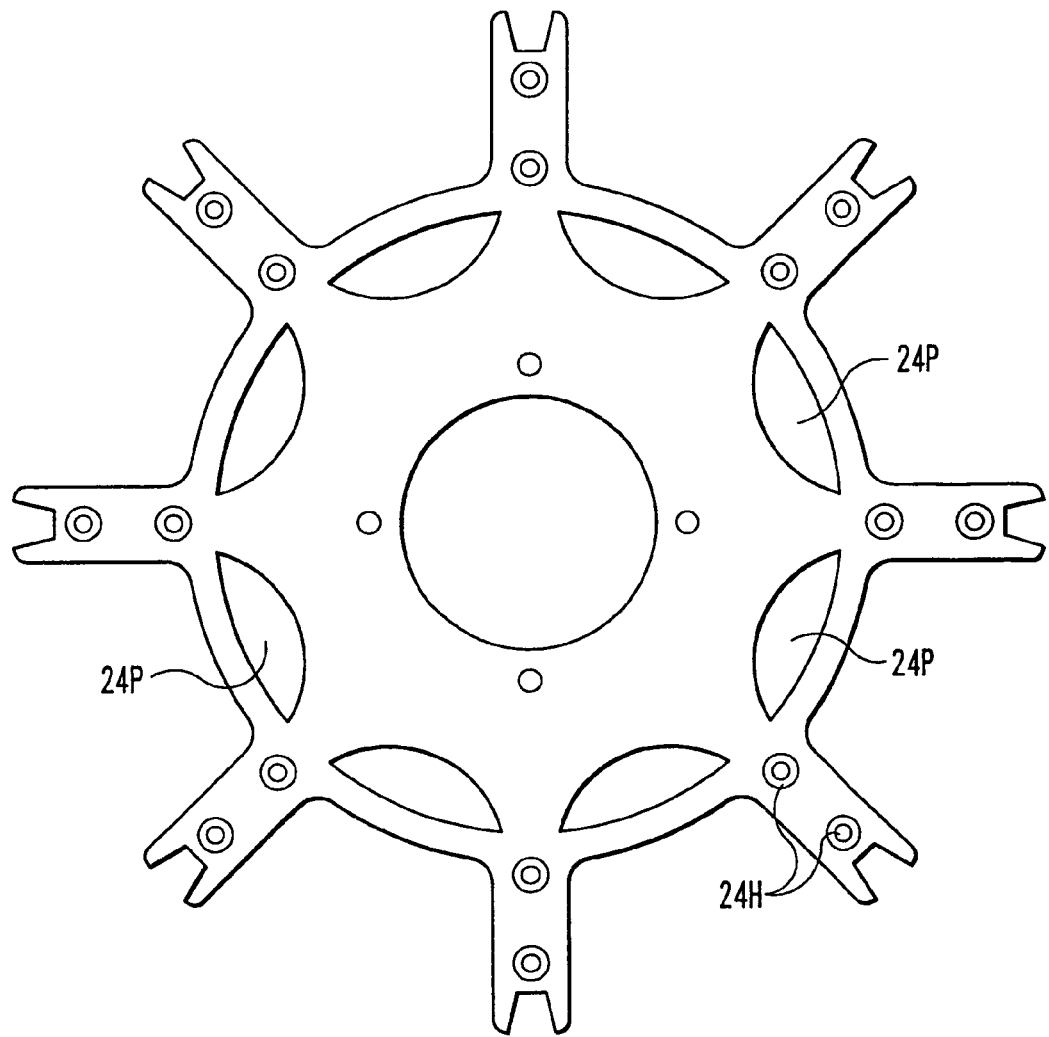
FIG. 6 is a face view of an upper support plate for the ingredient storage assembly.
Figure 7:
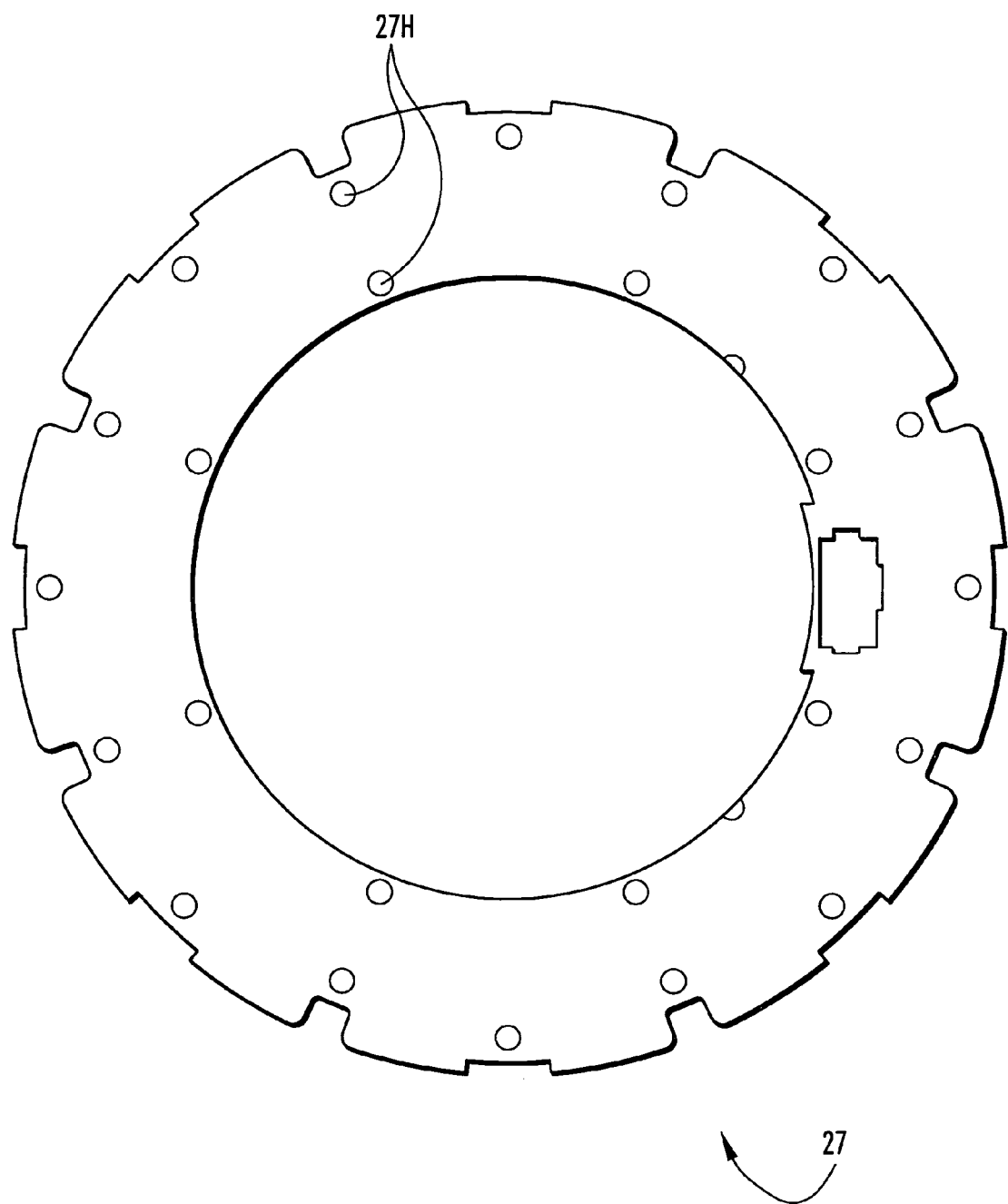
FIG. 7 is a face view of a lower support plate for the ingredient storage assembly.

The illustrated transfer tubing 96 comprises lengths of transparent PVC plastic with assorted shapes assembled to adapt to the particular freezer configuration. The tubing has a conical upper end portion 96U receiving the tapered lower end portion 23L of hopper 23. As can be seen in FIG. 2B, while the lower end portion of the dispensing hopper 23, and the upper end portion 96U of the tubing 96 are conical in shape to fit well together and avoid entry of dirt into the tubing 96, they are not wedged together. Being a slip-fit, the dispensing hopper and assembly above it can be separated easily from the apparatus below it if, and when desired. The lower end of tubing 96 has the elbow 96E received in one of the ports 91P of the housing 91. The unused port (or ports, if provided) 91P can be closed by a cap or caps such as 91T in FIG. 11.

In the illustrated example, the blender hopper 94 (FIGS. 12 and 15), usefully made of molded plastic, is shown in the form of a stepped conical device having two diametrically opposite outwardly-extending top flanges 94F, each extending approximately 60 degrees about axis 93. The blender hopper is mounted to the bottom of the housing 91 by placing the top edge of the hopper against the bottom face of the housing. Then the hopper is turned clockwise (as viewed from above) to move the hopper flanges 94F into position in grooves formed between arcuate retainer clips 91R (FIG. 2B) and flanges 91B (FIG. 18) on the bottom of the housing. The retainer clips are of the same shape as the flanges 91B and are screwed into the bottom of housing 91 at flanges 91B (FIG. 18).

The hopper has an inner wall surface which is stepped. In the illustrated example, the wall surface includes an upper cylindrical portion 94U with flanges 94F at the top, the upper portion extending downward to a first circle. An upper conical portion 94H extends downward from the first circle to a second circle. A second cylindrical portion 94C extends downward from the second circle to a third circle. A second conical portion 94L extends downward from the third circle to a fourth circle at the bottom of the hopper. A blending chamber 94M is surrounded by the lower portion 94L of the hopper.

The blender hopper surrounds a blending auger 97 of the screw type and which is centered on axis 93. The blending auger has a gear 98 integral with it or affixed to it and driven by a gear set 99 in a drive housing portion 91G of housing 91. At this point it should be mentioned that, while FIG. 1 shows tubing 96 entering housing 91 at a port location offset from and forward of axis 93, FIG. 2B shows tubing 96 entering the housing at 91P to the right of axis 93. As mentioned above, the two ports are available for the use of whichever one or both are convenient, depending on the configuration of the freezer. Also, if desired, locations of the ports relative to each other and to the drive housing portion 91G can be different from shown. There is an opening 91H (FIG. 18) through wall 91W in the proximal end of drive housing portion 91G where one of the gears in the gear set 99 engages gear 98 on the auger, as shown in FIG. 2B. The gear set is driven by a pinion 102 on the output shaft of blender motor 79 mounted to the distal end of the drive housing portion 91G.

Figure 12:
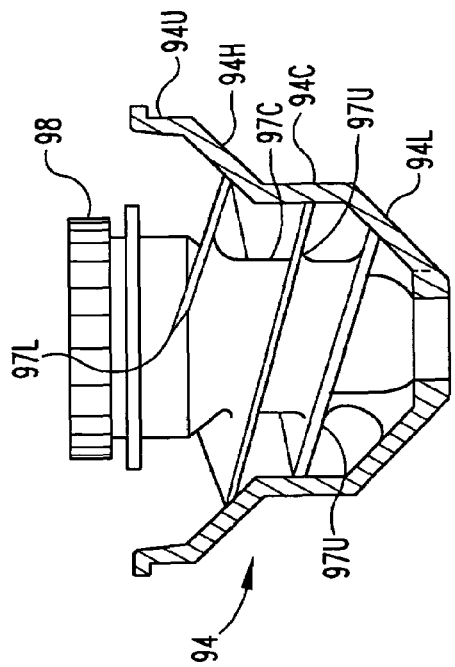
FIG. 12 is an elevational view of the auger in the hopper shown in section and viewed in the direction of arrows 12-12 in FIG. 11.

The housing ports 91P open downward into a space 91C (FIG. 11) under the cylindrical inner wall 91W of the housing 91 and open to the upper ends of the screw flights of auger 97. The blending auger 97 (FIGS. 9-14), which may usefully made of molded plastic, has a central, axially extending hollow core 97C (FIG. 10) on which there are two helical flights 97A and 97B, each of which is centered relative to axis 93. Each of the flights has a leading edge which is beveled downward and rearward as shown at 97L (FIG. 12). Each flight is contoured to have a profile which fits the profile of the stepped conical inside wall surface 94H, 94C and 94L of the blender hopper 94. Thus, it is seen that the auger flights have a profile contoured to sweep the inside space of the blender hopper outboard of the auger core as the auger is rotated on axis 93. To improve the efficiency of the auger, the perimeter of each flight has an edge which is cylindrical or beveled to conform to where it is axially along the auger relative to the inside wall surface of the hopper.

A tube 103 is a stationary tube having a longitudinal axis co-linear with axis 93, and is fixed to the housing 91. The tube delivers the flow of the frozen base product from the freezer to the blending chamber 94M. The tube also serves as an axle spindle for rotational bearing of the auger. The lower end 103B of the tube 103 is spaced above the base 94B of the blender hopper. The resulting space between the end of the tube 103 and the base 94B of the blender hopper allows the solids delivered by the auger to enter into the flow path of the frozen base product.

While the frozen base product flows, the auger 97 rotates clockwise (viewed from above) on the tube 103 and delivers the selected solids into the blending chamber 94M. The inside diameter d1 (FIG. 14) of the tube 103 is less than the overall maximum diametrical dimension d2 (FIGS. 14 and 15) of the fluted hopper outlet opening 94D. This allows unrestricted flow from the tube 103 through the blending chamber 94M and then through the hopper outlet opening 94D (FIG. 14). This size differential allows for the inclusion of the solids into the frozen base product in the blending chamber 94M for delivery of the blended product out through the blended product outlet opening 94D. It should be understood that the outlet opening can be circular or other shapes.

Two diametrically opposite cutouts 97P (FIGS. 9 and 11) in the auger core 97C near the bottom of the auger 97, allow the solids to be introduced into the flow path of the frozen base product while the auger 97 is rotating. The rotation of the auger 97, at approximately 400 rpm, inhibits the frozen base product from entering the outer circumference of the blending chamber 94M and working upward along hopper wall surface 94L. The rapid rotation of the auger 97 tends to confine flow of the base product to a flow path directly downward from the opening of the tube 103 and through the opening 94D.

The two helical flights 97A and 97B of the auger 97 are each provided with a two-step diminishing radius (with respect to the rotational axis 93). This diminishing radius provides a swept volume profile by the rotating auger and which fits the above-mentioned contour profile of the stepped inside wall surface (94H, 94C and 94L) of the blender hopper 94. The diminishing radius of the contoured wall of the blending chamber 94M causes the solids to be forced inward toward the flow path of the frozen base product. The diminishing radius also counters the tendency for the base product to flow to the outer perimeters of the blending chamber 94M. The diametrically opposite cutouts 97P in the core wall of the auger, enable the solids to be forced inwardly into the frozen base product as it flows from the lower end 103L of the tube to the outlet opening 94D.

The cutouts 97P through the core wall under flights 97A and 97B at the bottom faces such as 97U (FIGS. 9-14) may be formed in or cut in or otherwise provided in a material. Therefore the term "cutout" should not be construed as limited to an opening that is cut into the material.

Figure 10:
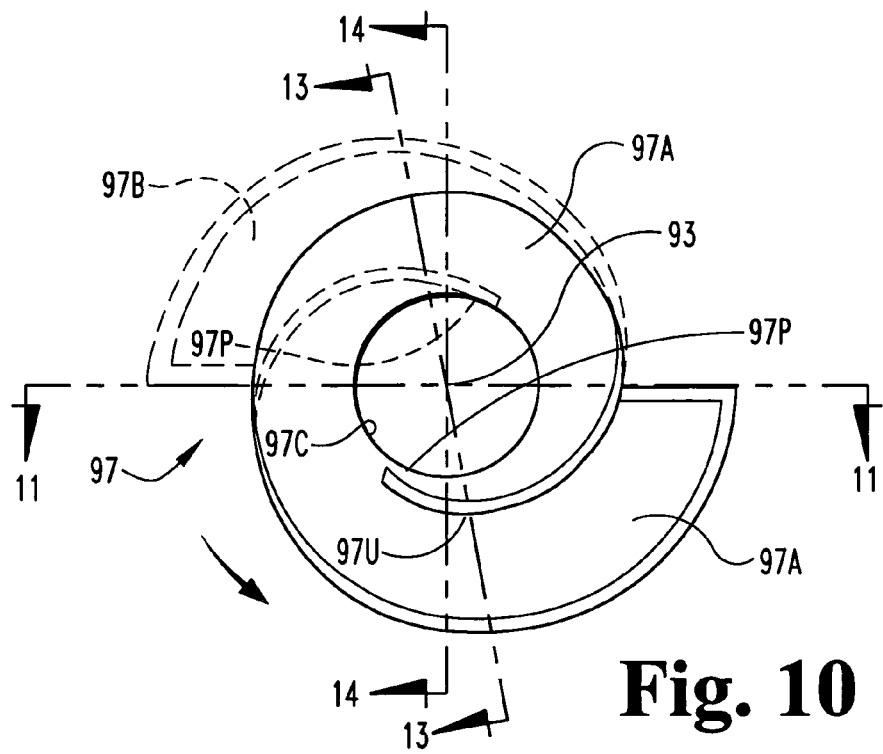
FIG. 10 is a bottom view of the blending auger.

FIG. 13 shows the core wall portions at section 13-13 in FIG. 10, immediately uphill of the beginning of the cutouts 97. FIG. 14 shows where the inner surface of the core flares outward in curves at section 14-14 to blend into the bottom faces of flights 97A and 97B immediately below where the cutouts begin downward toward the lower ends of the flights.

Figure 11:
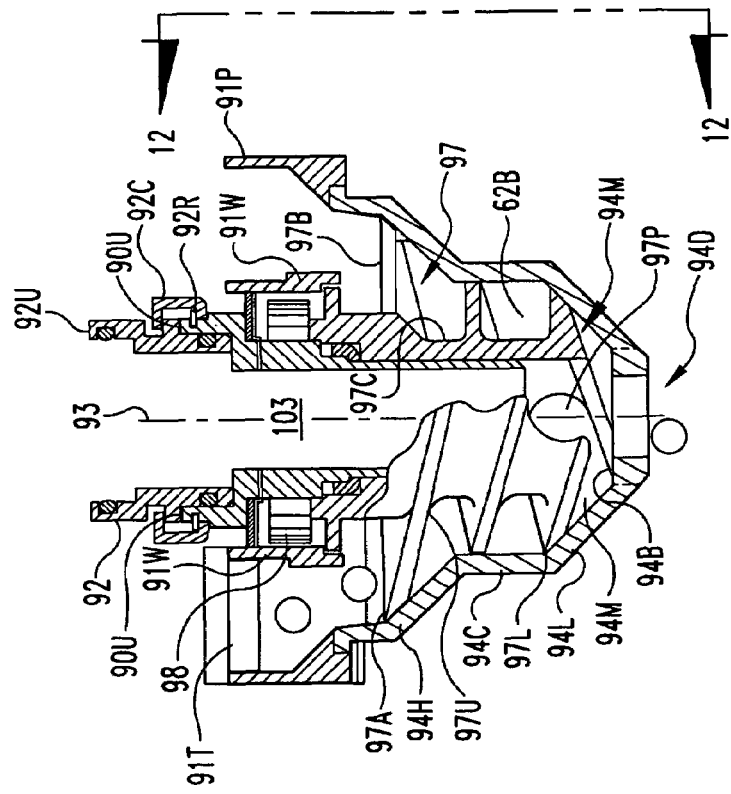
FIG. 11 is a fragmentary longitudinal sectional view taken at line 11-11 in FIG. 10, viewed in the direction of the arrows and showing the blending auger in a blender hopper which is shown in full section.

This provides easy entrance of solids into the frozen base product stream under the lower end 103L of tube 103 flowing to outlet 94D as the auger rotates in the direction of arrow 104 (FIG. 10), which is clockwise when viewed from the top of the auger. Portions of the inside wall of the core 97C continues down as shown in FIGS. 11 and 14 supporting the tips 97T of the flights in cantilever fashion at the bottom ends of the flights.

It should be noted that while it is very convenient, and preferred to have the auger axis in line with the axis direction of discharge of base product from the freezer, it is not absolutely necessary. Also, while it is preferred to have the passageway from the spigot through the blender provided by a tube which also serves as the bearing axle for the auger, the auger axis could be offset from the tube axis. Also, while the tube can serve directly as the bearing for the auger, as shown, it could simply serve as a mounting for separate bearings.

Referring to FIG. 18, the data entry panel (DEP) 76 has numerals 1-8, each designating a "key" by which the dispenser operator can select a different one of the eight ingredient containers. It also has several other "key" identifying legends on it, including a "cancel entry" legend, a "+", a "–", and an "alt time adj" legend. It also has an "output level" indicator light emitting diode set with eight enumerated levels, and an "overload" indicator light.

Operation of FIGS. 1-19 Embodiment

As indicated above, the embodiments of the invention are intended to be attached to a freezer capable of delivering an icy base product, to blend or mix various ingredient solids into the base product as it flows from the freezer toward a customer's serving cup. The system example described above accommodates eight different ingredients. The operator can select a single ingredient or up to as many as eight different ingredients to be blended into a single serving of the frozen base product.

To dispense a serving to a customer, the operator determines the output level (the duration of time of operation of each of the selected ingredients) per cycle of dispensing ingredients requested by the customer. Then the operator touches those of the selector "keys" needed for the ingredients requested by the customer. This sets up the program for the controller 61 to activate, in sequence, the dispenser motors 36 for those of the eight containers holding the ingredients requested by the customer. Then the operator pulls the draw handle 16 down, enabling the frozen base product to flow down through the auger axis passageway in tube 103. When the operator pulls the draw handle down, the draw switch 82 is closed which activates the dispensing motor 36 in the dispensing module that represents the lowest numbered choice in the operator's selection 1-8. As the motor activates, it rotates the transfer impeller 38 that takes the ingredient solids from the selected container 32 and transfers them to the registering openings 29H, 24P dropping the solids into the dispensing hopper 23. The transfer impeller serves both as a valve and a device to transfer the ingredients toward the dispenser hopper 23. The solids flow down through the transfer tubing 96 into the blender hopper 94 and down through the hopper under control of the auger 97, into the blender chamber 94M where the solids are integrated into the frozen base product as the base product flows out of the lower end of tube 103.

At the same time that the draw switch is closed to start the dispensing process, the blender motor 79 is activated, rotating the blending auger 97 in a clockwise direction (viewed from above) to force the ingredient solids into the frozen base product while it flows from the tube through the hopper outlet opening 94D into a cone or dish for the customer. If the operator has selected a multiple of possible choices of ingredients, the system dispenses each choice singularly and in the ascending sequence of the numbers of the choices selected on the DEP (data entry panel) 76. The operating time is equal for each dispensing module during a sequence through the operator's selection. When the system has sequenced through all of the choices (completed a cycle), it returns to the initial choice and continues the rotation through the selected choices until the operator chooses to discontinue the process by closing the spigot draw handle. The operating time for each module can be changed to increase or decrease the cycle time for each serving, by touching the "alt time adj" "key" and the "+" or "–" key. As the operator changes the cycle time, the "output level" lights are illuminated accordingly to indicate the output of the solids into the frozen base product. For example, if the adjustment is such that light 9 is on, it indicates that each module in a selection following the "alt time adj" adjustment will dispense solids longer in a cycle than if the adjustment were such that light 6 was on. The average typical cycle time is 1 second. The preferred minimum cycle time is 0.2 seconds. The preferred maximum cycle time is 2.0 seconds. Other cycle characteristics can be specified, if desired. The draw duration is typically between 5 and 10 seconds. This depends primarily upon the size of serving to be delivered to the customer, and the delivery speed of which the freezer is capable. In any case, the controller 61 will repeat the cycling through the choices as long as the draw switch 82 remains closed. It should be understood that some freezers have switch keys, rather than handles to operate a switch to draw the frozen base product from the freezer. In such cases, such switch can be used instead of switch 82 to operate the apparatus of the present invention. Therefore the term "switch"

where used in the claims which follow herein, should not be construed as limited to a separate, handle operated switch, except where required by claim context.

To refill a container, the module is removed by loosening the retaining knob 51, and pulling the module radially outward. Then it is inverted, so that the container 32 is upright. Then the module is pulled upward off the container. Then the container can be refilled with the same ingredient, or cleaned and refilled with some other ingredient.

From the above description, it can be recognized that all of the disclosed apparatus can be easily disassembled for cleaning, and then re-assembled.

The apparatus can be powered conveniently by any suitable electric source, an example being a power supply portion of controller 61 and operable on either 110 or 220 volts at 50 or 60 hertz.

The above description refers to the use of a draw handle to initiate delivery of base product from the freezer, and delivery through a spigot, and a switch associated with the draw handle to initiate operation of the dispenser motors and the auger. It should be noted that the invention is useful on a variety of freezers. Therefore, initiation of flow of the base product and controller functions can be triggered by some initiator other than a draw handle. Examples include but are not limited to a switch key or a sound or voice-activated switch. The use of the term "key" should be understood to mean some activator spot or device responsive to the operator's command, however delivered. Wiring, electronics and software for the selector and controller to produce the functions described herein are well within the skill of the art, and description herein would be superfluous.

Referring now to FIGS. 20-23, components which are the same as in the previously described embodiment are given the same reference numerals. Those which differ provide additional features of these embodiments of the invention. The soft-serve ice cream freezer assembly 11 has the spigot assembly 13 mounted on a front plate mounted on the freezer. The spigot has an operating handle 16 which operates in the same manner as described above. The ingredients stored in the transfer assembly can be mounted as described above. The blender assembly 90 is coupled to the spigot 13 by an adapter 192 (FIG. 21) having the upper end 192U received on and sealed by an O-ring to the spigot spout 13S. Some of the components in the blender assembly are the same as in FIG. 11 described above.

Figure 21:
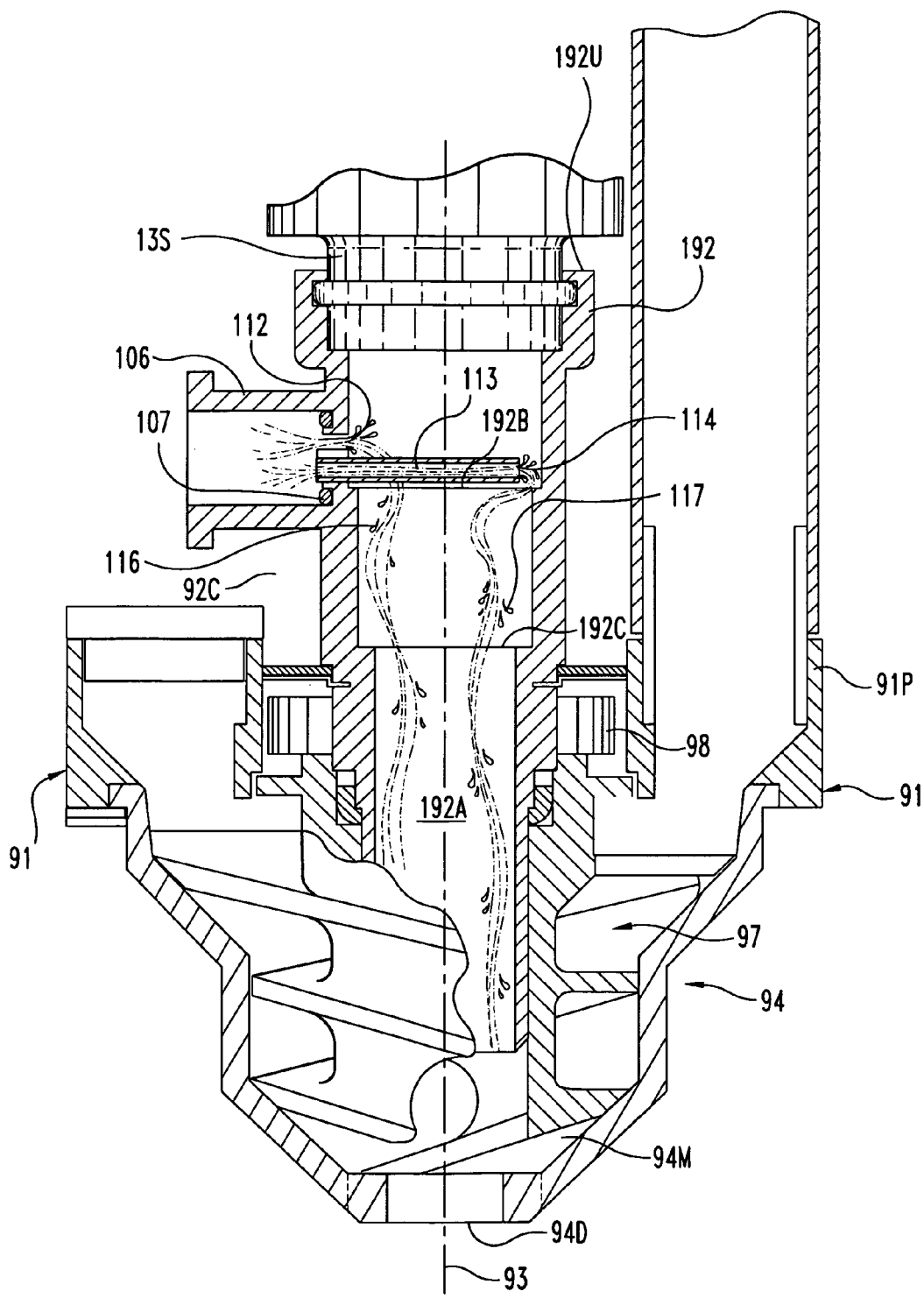
FIG. 21 is an enlarged fragmentary sectional view similar to that of FIG. 11 but adding flavoring syrup introduction features according to this further embodiment of the invention.

The adapter 192 of FIG. 21 is different from that in FIG. 11 in several respects. It is one piece of material fitting directly onto spigot spout 13S. It incorporates directly, an auger axis portion 192A. Also, it incorporates directly, fitting receiver 106 which is coupled to a flavoring syrup storage and delivery module 108 such as module 12 in my U.S. Pat. No. 6,689,410 B2 issued Feb. 10, 2004, hereinafter sometimes referred to as the '410 patent', the content of which is incorporated herein in its entirety by reference. More specifically, the receiver 106 receives a manifold such as 34 in the '410 patent. A snap lock fitting assembly 110, like fitting 37 of the '410 patent is received on the receiver 106 and connected to a supply line fitting 105 like fitting 38 of the '410 patent. Other types of connectors and fittings can be used.

Module 108 is like that in the '410 patent in that it has liquid containers 9, containing liquids having different characteristics such as for flavoring, coloring, or adding carbonation, for example. These liquids can be added selectively, to the base mix which flows down from the spigot 13.

Module 108 receives power from controller 61. A syrup flavor command module 111 like module 1 in the '410 patent is coupled to module 108 like module 12 in the '410 patent, for receiving power from module 108 and for selection and control of flavors, also as described with reference to module 12 in the '410 patent.

The syrup receiver 106 communicates with a port 112 in the wall of the adapter 192. It also communicates with a tube 113 which extends through the wall of adapter 192 and across the interior of the adapter to an end opening 114 of tube 113. This opening is spaced from the tube wall opposite the port 112 of the tube. In this way, syrup (indicated schematically by the droplets 116 and 117) can enter the flow of the frozen base product being dispensed from the spigot, for flavoring of the frozen base product as it moves toward departure from the lower end of the tube portion 192A. At this point the flavoring syrup has mixed well with the base and is further blended with the ingredient solids being augured down through blending hopper into the blending chamber 94M for discharge of the blended and flavored product through the blended product outlet opening 94D.

Another feature of the adapter 192 is a set of steps 192B and 192C on the inside wall. In the illustrated example, the inside wall of the adapter is cylindrical, and so are the steps. Step 192B is a short distance downstream from the liquid additive entrance ports 112 and 114. Step 192C is farther downstream. These steps help the entering additive liquid (syrup, for example) to spread laterally as the frozen base mix flows down the passageway.

In those instances where the frozen base mix is of a consistency more like an ice cream than a shake mix, the rotating action of the auger in the blending chamber 94M causes the flavoring/coloring syrup to "enrobe" the flow of ice cream through the blending chamber 94M. The fluted blended product outlet opening 94D causes the enrobed ice cream to exit the opening in a striped pattern.

The FIG. 21 embodiment of the invention has been described using the '410 patent disclosure as the source of selectable liquid additives. If there are other sources with such capability, perhaps they may be coupled to the blender according to this embodiment.

This FIG. 21 embodiment of the invention provides the opportunity for not only blending solids into the frozen base as in the previously described embodiment, but also selecting one or more liquid additives for the base material. While it is usually preferable to select one flavor for the end product, several can be mixed if desired, just as several different solid ingredients can be included, if desired, in one serving. Also, a flavoring liquid may, and usually will, incorporate a colorant.

Figure 22:
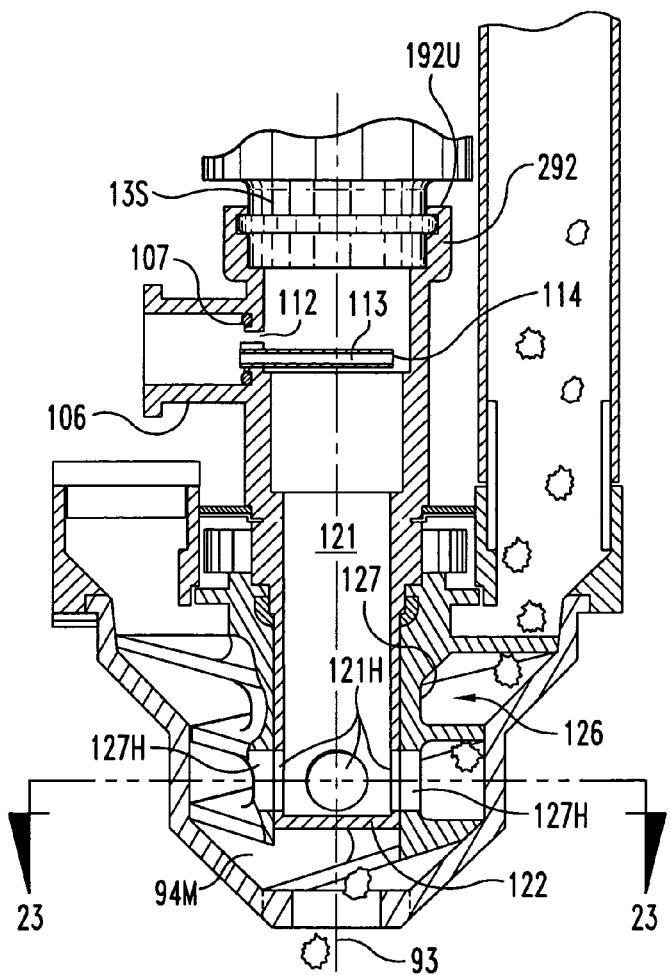
FIG. 22 is a view similar to FIG. 21 but showing a further embodiment of the invention with features for blending fine particulates.
Figure 23:
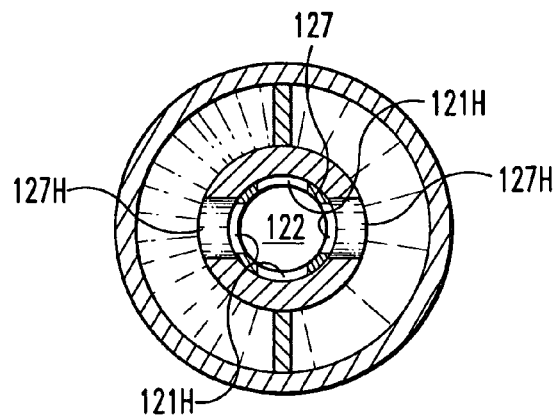
FIG. 23 is a cross-section at line 23-23 in FIG. 22 and viewed in the direction of the arrows.

Referring now to FIGS. 22 and 23, a further embodiment is disclosed. This embodiment facilitates blending into a frozen base product such as for a milk shake, solid materials that have been crushed or otherwise made or reduced in size to fines (particulates 0.125 inches or less maximum dimension in any direction), where total integration of the fines into the mix is desirable.

In this embodiment, the features are the same as in the embodiment of FIG. 21 with several exceptions. For example, the auger axis tube/adapter 192 of FIG. 21 is replaced by the tube/adapter 292 in FIGS. 22 and 23. This part is very similar to tube 192 but it has a bulkhead or closed lower end 122. It also has four ports 121H circularly spaced around the axis 93 at 90-degree angles between them. Auger 126 is similar to auger 97 except that auger 126 has a core 127 with two holes 127H at diametrically opposite locations in the wall of the auger core 127 between flights of the auger.

In this embodiment of the invention, as the auger rotates and the two holes 127H in the auger come into alignment or registry with any of the four holes 121H in the tube 121, the frozen base is forced outward through the spindle holes 121H and through the holes 127H in the auger core, and enters the space between the flights of the auger. As this happens, solids moving downward in the auger are blended directly into the frozen base, even before they get to the blending chamber 94M. Further blending of the fines can occur in the blending chamber 94M. The FIGS. 22 and 23 embodiment of the invention also has the adapter and flavoring supply features of the embodiments of FIGS. 20 and 21.

The preferred speed of rotation of the auger in these additional embodiments of FIGS. 21-23 is approximately 400 revolutions per minute. Other speeds and ranges may be used if desired.

Operation of the FIGS. 20-23 Embodiments

The operation of these embodiments is like that described above for the FIGS. 1-19 embodiment. Where fines are to be used and blended into a milk-based product like a shake, for example, the tube with closed bottom end as in FIG. 22, is likely preferred, to get thorough blending of the fines into, rather than just coating the outside of, the base. The FIG. 22 embodiment can be used with, or without, the flavoring feature. If the liquid additives, whether for flavoring or coloring, or both, are to be used, the basic procedure for operation is the same as described above, using the data entry panel 76 of FIG. 19. But, in addition, a flavor command module 111 such as module 1 in the '410 patent will be engaged. For this purpose, the switch 82, supplied with power from controller 61, has an output 80 to command module 111 so that the selected flavoring introduction commences as well as the selected solid introduction, when the switch is closed by operation of the draw handle 16 or whatever other device may be used to initiate flow of the frozen base product. The sanitizing feature for the flavor adding equipment described in the '410 patent can be employed, preferably with the flavor adding equipment disconnected from receiver fitting 106.

While the invention has been illustrated and described in the drawings and foregoing description, the same is to be considered as illustrative and not restrictive in character, it being understood that all changes and modifications that come within the spirit of the invention and the scope defined by the claims that follow, are desired to be protected.

What is claimed:

1. Apparatus for providing, on-demand of a soft-serve dessert customer, the blending of edible ingredient solids into a frozen edible base product when flowing from a freezer, the apparatus comprising:
   a blender assembly which has an inlet for coupling to a dispenser outlet of a freezer, for receiving said frozen edible base product from said dispenser outlet of the freezer into said blender assembly, said blender assembly having an outlet for dispensing a blended product from said blender assembly, and said blender assembly having a passageway with an entrance at said inlet and an exit spaced from said blended product outlet;
   a storage assembly including a plurality of containers for storage in different ones of said containers, different ingredient solids for selective blending with said base product passed through said passageway;
   a transfer device coupled to said storage assembly and to said blender assembly for receiving selected ones of said solids from said storage assembly and for guiding said selected ones of said solids from said storage assembly into said blender assembly;
   said blender assembly including a blender hopper coupled to said transfer device for receiving said selected ones of said solids from said transfer device and for introducing said selected ones of said solids to said base product when said base product from the freezer is flowing out from said passageway toward said blended product outlet;
   a blending chamber in said blender hopper between said passageway exit and said blended product outlet;
   a blending auger in said blender hopper and including at least a portion of said passageway and mounted for rotation on an axis of rotation for moving said solids toward said blended product outlet, said auger having an intake end and having a discharge end;
   a blender motor coupled to said auger for rotation of said auger on said axis;
   valves associated with said containers and operable, when actuated, for release of selected ones of said stored ingredient solids from said storage assembly to said transfer device; and
   a controller coupled to said blender motor and to said valves to operate said auger to move released ingredient solids into said base product in said blending chamber during passage of said base product from said passageway to said blended product outlet.

2. The apparatus of claim 1 and further comprising:
   a plurality of valve activators, each of said activators being associated with a different one of said containers than all of the other activators, and operable independently of all others of said activators, for release of ingredient solids from the one container with which one of said activators is associated, independent of the other containers of said plurality.

3. The apparatus of claim 2 and wherein:
   the first-mentioned controller is coupled to said blender motor and to said valve activators and is operable to establish a time cycle of operation of said activators;
   the apparatus further comprising:
   a selector coupled to said first-mentioned controller and manually operable to enable a user to select which of said activators will be operated during a cycle of operation of said activators to dispense to a receiver cup, a single serving of user-elected blend of soft-serve dessert.

4. The apparatus of claim 3 and further comprising:
   a switch coupled to said controller and operable, when actuated, to initiate and maintain a period of flow of said edible base from said freezer, and a period of operation of said blender motor.

5. The apparatus of claim 2 and further comprising:
   a source of flavoring liquids coupled to said blender assembly,
   said source having a plurality of liquid containers separately containing different edible flavoring liquids; and
   a second controller coupled to said liquid containers for selection of different edible liquids for introduction to said blender assembly for blending selected ones of said liquids into said base product.

6. The apparatus of claim 1 and wherein:
   said blender assembly has a second inlet coupled to said flavoring liquid source to receive selected liquid from said source; and
   said second inlet is located in communication with said passageway to introduce flavoring liquid from said source to said frozen edible base received from the freezer.

7. The apparatus of claim 6 and wherein:

said second inlet communicates with said passageway at a location closer to the first-mentioned inlet of said blender assembly than it is to said outlet of said blender assembly.

8. The apparatus of claim 6 and wherein:

said exit end of said passageway is in said blender chamber and spaced from said blender assembly outlet accommodating exit of said frozen edible base from said passageway into said blender chamber for blending with said introduced solids before dispensing from said blended product outlet.

9. The apparatus of claim 6 and wherein:

said second inlet includes a first port communicating directly with a wall of said passageway;

and second port receiving a tube through a wall of said passageway across a portion of said passageway and having an end spaced from an opposite wall of said passageway for passage of said flavoring liquid into said passageway at a location spaced across said passageway from said first port.

10. The apparatus of claim 6 and wherein:

said passageway includes a tubular portion near said exit end and has a wall across enclosing said exit end and at least one transverse opening at said exit end for exit of said frozen edible base into said blender chamber.

11. The apparatus of claim 6 and wherein:

said exit end is open for discharge of said edible base product axially out of said tubular portion.

12. The apparatus of claim 6 and wherein:

said tubular portion receives and supports said blending auger for rotation about an axis of said tube.

13. Apparatus for blending edible ingredient solids into a flowing, frozen edible base product and comprising:

an auger axle tube having a longitudinal axis and having an upper end with a circular connector portion for coupling to and alignment with a dispenser outlet of a freezer for said base product and for passage of said base product from said dispenser outlet through said tube toward a blended product outlet, said tube having a lower end;

a storage assembly for storage of different types of ingredient solids for blending with said base product passed through said tube;

a blender having an inlet for receiving ingredient solids from said storage assembly and for introducing the ingredient solids to said base product;

a blending space in said blender between said blended product outlet and a portion of said tube adjacent said lower end;

a blending auger in said blender and encircling at least a portion of said tube and mounted on said tube for rotation on an axis of rotation for moving said solids toward said blended product outlet, said auger having an upper end and having a lower end;

valves associated with said storage assembly and operable, when actuated, for release of stored ingredient solids from said storage assembly to said blender inlet; and a controller coupled to said auger and to said valves to operate said auger to move released ingredient solids into said base product during passage of said base product from said tube to said blended product outlet.

14. The apparatus of claim 13 and wherein:

said storage assembly includes a plurality of containers, each containing different types of ingredient solids;

said apparatus further comprising:

a liquid storage assembly including a plurality of liquid containers, different containers of said plurality containing liquids having different characteristics;

a liquid passageway between said liquid storage assembly and said auger axle tube for passage of selected liquids from said liquid storage assembly to said base product passing through said tube; and a second controller coupled to said liquid storage assembly for selection of at least one of said liquids for passage from said liquid storage assembly to said base product during passage of said base product through said tube.

15. The apparatus of claim 14 and wherein:

the different characteristics of some of said liquids are different flavoring.

16. The apparatus of claim 14 and wherein:

the different characteristics of some of said liquids are different coloring.

17. The apparatus of claim 14 and wherein:

at least two inlets are provided in said tube for entry of a selected liquid from said liquid storage assembly, with one of said inlets at one side of said tube and the other inlet at another side of said tube for admission of at least one of said liquids to said base product passing through said tube at different sides of a path of flow of said base product from said dispenser outlet through said tube toward said blended product outlet.

18. The apparatus of claim 17 and wherein:

said blended product outlet is star shaped for imparting a decorative feature on said base product flowing out from said blender through said outlet toward a customer's container.

* * * * *

UNITED STATES PATENT AND TRADEMARK OFFICE
CERTIFICATE OF CORRECTION

PATENT NO. : 7,621,669 B1  Page 1 of 1
APPLICATION NO. : 11/181604
DATED : November 24, 2009
INVENTOR(S) : Ernest C. Gerber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1133 days.

Signed and Sealed this

Fourteenth Day of December, 2010

David J. Kappos
*Director of the United States Patent and Trademark Office*